R. A. FESSENDEN.
METHOD FOR MEASURING DISTANCE.
APPLICATION FILED APR. 2, 1914.
1,217,585.
Patented Feb. 27, 1917.
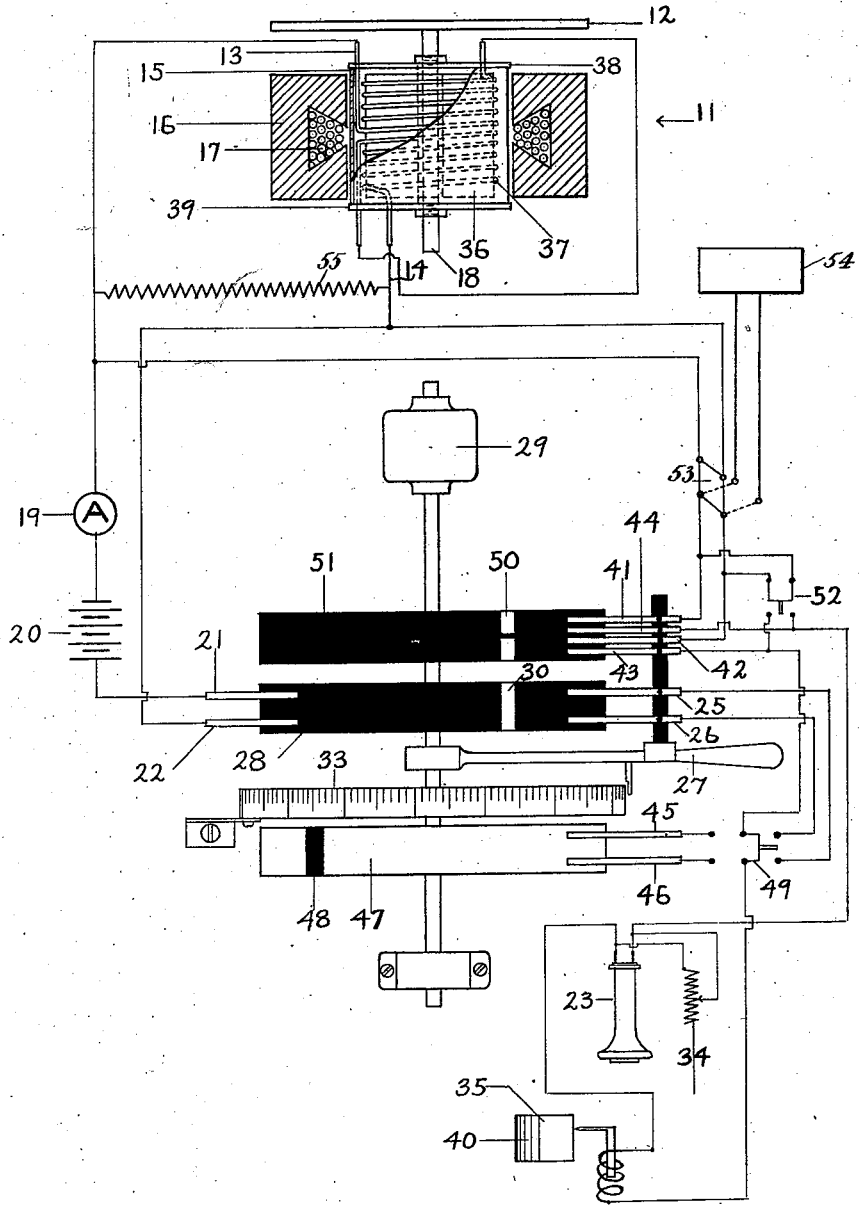
WITNESSES:
M. E. Flaherty.
A. E. O'Brien.
INVENTOR
Reginald A. Fessenden
BY
Orahn & Hays
ATTORNEYS.

UNITED STATES PATENT OFFICE.

REGINALD A. FESSENDEN, OF BROOKLINE, MASSACHUSETTS, ASSIGNOR TO SUBMARINE SIGNAL COMPANY, OF WATERVILLE, MAINE, A CORPORATION OF MAINE.

METHOD FOR MEASURING DISTANCE.

1,217,585.   Specification of Letters Patent.   Patented Feb. 27, 1917.

Application filed April 2, 1914. Serial No. 828,972.

*To all whom it may concern:*

Be it known that I, REGINALD A. FESSENDEN, of Brookline, in the county of Norfolk and State of Massachusetts, a citizen of the United States, have invented a new and useful Improvement in Methods for Measuring Distance, of which the following is a specification.

The invention described herein relates to methods and apparatus whereby having given, or having ascertained two or more of the following quantities, *i. e.* time, distance, intensity and medium, one or more of the remaining quantities may be determined.

For example, being given the distance between two points in a mine and having determined the time taken by a sound wave to travel between the two points, it is possible to draw conclusions with regard to the probable nature of the rock between the two points; or if an echo be observed or a refraction of the sound, it is possible to estimate the distance of the reflecting or refracting vein.

Again, if a sound be produced on a ship and the time elapsing between the production of the sound and its echo from the bottom be determined, it is possible to determine the distance between the bottom of the ship and the bottom of the water. If the intensity of the echo be determined, it is possible to determine approximately the character of the bottom, that is, whether it be mud, or sand, or gravel, or rock.

If the echo be from an iceberg or layer of melted ice surrounding the iceberg or from another ship, it is possible to determine how far the iceberg is from the ship.

The invention relates especially to sounding, but is not limited to measuring distance in a vertical direction, or in a single medium, being applicable to all directions and mediums, and to determine other quantities besides distance as stated above, for example, the nature of the medium.

The accompanying drawing forming a part of this specification shows diagrammatically apparatus suitable for use in connection with my invention.

That distance could theoretically be determined by sound echoes has long been known, but this knowledge has never been put into commercial use on account of the lack of any method which was practical and of the lack of any practical apparatus. For example, if a ship drawing twenty-five feet was running up a channel having a depth of fifty feet, the time taken by the sound of a bell in traveling from the bottom of the ship to the bottom of the channel and back to the ship would be only about one one-hundredth of a second, and to determine the depth to within one foot would necessitate knowing the time elapsing between the time at which the bell clapper struck the bell and the time at which the echo returned to the nearest four ten-thousandths of a second which is impossible by any method heretofore suggested or in use.

In addition, since the sound of the blow of the bell would be heard in the receiving apparatus, the ear would be rendered insensitive and the echo would not be heard, being much fainter and being drowned out by the vibration of the bell persisting after the clapper had struck.

My method comprises a number of new features, and while all of them are not necessarily used in combination in all cases, they are peculiarly adapted to coöperate to give good results in the cases most commonly met with.

One of these features is that the sound production and echo reception are electrically interlocked, so that the time elapsing between them is determined by the time elapsing between two electrical phenomena, and can be determined with great accuracy.

A second is that the receiver is cut out while the sound is being produced and the sound producer is cut out while the sound is being received.

A third is that the sound impulse is produced over a definite time and at a definite intensity and then ceases abruptly, instead of dying away gradually.

A fourth feature is that the depth may be recorded graphically on a moving tape.

A fifth feature is that the same apparatus (a magnetophone, for example,) may be used to produce the sound and to receive it.

A sixth feature is that the electric impulse used for producing the sound by the motion of the current carrying conductor may be derived from a direct current source.

There are other features which will be apparent from the description, and are novel in method and apparatus.

In the figure 1 is a source of sound, preferably the oscillator described in my United States Patent No. 1,167,366, dated January 4, 1916. Here 12 is the diaphragm which being immersed in water in the fore peak of a vessel, or inserted in the skin of the ship, by its motion produces the sound. 13 and 14 are the terminals of a fixed winding 37 on the core 36, and 15 is a movable copper tube attached to the rod 18 by the disks 38, 39, which rod is fastened to the diaphragm 12. 16 is an electromagnet excited by the coil 17. When an alternating or fluctuating current passes through the core winding 37 currents are induced in the copper tube 15 by transformer action, and the tube being in the strong magnetic field generated by a direct current in the coil 17, oscillates with great force, and actuates the diaphragm 12, producing a sound which ceases immediately the electric current ceases to pass through the winding 37.

A wheel or commutator 28 of insulating material and having a metallic segment 30, is rotated at a definite speed by the motor 29. The battery or other source of voltage indicated at 20 and the ammeter 19 are connected to the brush 21 and one terminal 13 of the winding 37, and the brush 22 is connected to the other terminal 14.

When the brushes, 21, 22 both rest on the conducting segment 30, the battery 20 sends an electric impulse through the winding 37 and the diaphragm 12 is pushed out or in producing a sound in the water, and this occurs at each revolution of the commutator 28.

In this way a musical note is produced whose pitch will depend upon the number of revolutions per second of the commutator 28.

The oscillator above described also acts as a sound receiving transmitter for on a sound wave striking the diaphragm 12, it is moved in and moves the tube 15 which, being a conductor moving in a magnetic field, has a current generated in it by the movement, and this current in turn generates a current in the fixed winding 37 by transformer action, which flows out by the terminals 13, 14 to the brushes 41, 42 on the hard rubber wheel 51, thence, when the conducting segments 50 pass beneath them, to the brushes 43, 44, and thence through the telephone receiver 23 and recording apparatus 35, either or both of which may be termed an indicating mechanism, to the two-way switch 49, and thence to the brushes 25, 26, whenever the two-way switch is closed to the right and the segment 30 of the wheel 28 passes beneath the brushes, thus completing the circuit.

It will be seen that the telephone receiver circuit is only completed when the segments 30 and 50 pass beneath the brushes in the receiver circuit, and that this will occur at some time later than the segment 30 has passed beneath the brushes 21, 22 generating the sound. Consequently no sound will be heard in the telephone receiver 23 until the brushes 41, 42, 43, 44, 25, 26 are shifted by the movable arm 27, to which they are attached, to such a position that the segments 50, 30 pass under them at exactly the instant that the echo from the sound has come back from the bottom and struck the diaphragm 12.

And it will be apparent, since the wheels 28 and 51 revolve at a fixed speed, that the angle through which the brush arm 27 is moved will be a function of the distance of the reflecting bottom, and that the apparatus may be so constructed and graduated that this distance can be read off directly on the scale 33 in feet.

To ascertain in the first place whether there is any iceberg, for example, near enough to produce an echo receivable on board a ship carrying the sounder, I prefer to cut out the brushes 41, 42, 43, 44 by the switch 52 and to throw in the double pole switch 49 so as to connect the receiver circuit to the metal wheel 47 which carries the insulating segment 48. This segment 48 is so located on the periphery of the wheel 47 that as the wheel 47 rotates the segment 48 passes under the brushes 45, 46 and breaks the circuit through them at exactly the instant the battery circuit is closed and its current generates a sound, that is, at exactly the instant the brushes 21, 22 rest on the conducting segment 30 so that the receiver circuit is always closed through the oscillator except at the instant the sound is being generated. During this period the receiver is always receptive except at the moment sound is being sent out and as soon as the receipt of echoes begins they will be received at the indicating mechanism. When so received the switches 49 and 52 are thrown back so that the brushes 45, 46 are cut out and the brushes 41, 42, 43, 44 are cut in and the process of determining the distance of the reflecting surface (iceberg) is carried on as before described.

The metal wheel with its connecting mechanism serves therefore for a preliminary observation only as it will give exactly the moment when the first echo is received on a vessel approaching a reflecting surface.

Instead of this the brush arm may be shifted until the musical note or echo is picked up; but by this course it is not so certain that the first indication of echo will be received because it may come while the circuit through the brush arm connection is open.

It will of course be understood that as shown in the drawing the segments 48 and 30 are not in proper relation to secure the above result. A proper adjustment of the wheel 47 on its axis would remedy this fault, but such adjustment would carry the segment 48 to the under side of the wheel so that it would not be shown in the view.

The recorder 35 may be of any of the usual types, preferably one by which the record is made in a moving strip of paper 40 such as for instance the well known Callender thermal recorder.

The wheel 51 is for cutting out electrostatic disturbance which might be produced on the receiver 23 unless the circuit were opened at the ends of both leads to the receiver. The wheel 51 accomplishes this by having two conducting segments 50 side by side on its periphery, one of which engages the brushes 41, 44 and the other 42, 43. When these brushes do not rest on the segments 50 the circuit is broken on both sides of the receiver. At 34 is shown means for measuring the intensity of the sound which may be used if desired.

This device is a variable resistance and is operated by throwing in resistance until the sound is modified so as to be just audible and taking account of the amount of resistance thrown in, then by performing the same operation when another sound is received. By comparing the amount of resistance thrown into circuit in each case the intensity of the sounds are measured comparatively.

The apparatus may be used to locate icebergs or geological strata or other reflecting bodies. For measurement of long distances the speed of rotation of 28 may be slow, or an ordinary stop watch used to measure the time instead of shifting the arm 27. For icebergs a long wave length is preferably used to insure reflection or diffraction fringes. The wave length may be as long as 100 feet or more.

In place of connecting the source of sound 11 to the echo indicating mechanism 23, 23 may be connected, by throwing the switch 53 to the position shown by dotted lines so as to connect a second receiving transmitter 54, 11 being used for producing the sound and 54 being used for receiving the echo.

This method is especially valuable when the depth of sounding is small and when the diaphragm 12 does not come to rest with sufficient abruptness.

Another method of accomplishing this, i. e., bringing the diaphragm to rest substantially instantaneously is by placing a resistance 55, preferably non-inductive, across the terminals of the oscillator as shown.

The method is also distinguished from previous methods in that the electric forces act directly upon the diaphragm to set it in motion to produce sound instead of first acting upon an intermediate mechanism such as a hammer and then causing the hammer to impact upon the diaphragm and thereby produce the sound. The omission of the intermediate mechanism greatly increases the efficiency of the apparatus.

What I claim as my invention is:

1. The method of measuring distance by sound inflection which consists in varying the current in an electric circuit at the sending end, setting up at the sending end sound vibrations identical in time with the current variations in said electric circuit, directing said sound vibrations against an objective, transforming the sound vibrations inflected by said objective when received into electric impulses identical in time with said received sound vibrations and measuring the time elapsing between the beginning of each set of electric impulses.

2. The method of measuring distance by sound inflection which consists in varying the current in an electric circuit at the sending end, setting up at the sending end sound vibrations identical in character with the current variations in said electric circuit, directing said sound vibrations against an objective, transforming the sound vibrations inflected by said objective when received into electric impulses identical in character with said received sound vibrations and measuring the time elapsing between the beginning of each set of electric impulses.

3. The method of measuring distance by sound inflection which consists in varying the current in an electric circuit at the sending end, setting up at the sending end sound vibrations identical in frequency with the current variations in said electric circuit, directing said sound vibrations against an objective, transforming the sound vibrations inflected by said objective when received into electric impulses identical in frequency with said received sound vibrations and measuring the time elapsing between the beginning of each set of electric impulses.

4. The method of measuring distance by sound inflection which consists in varying the current in an electric circuit at the sending end, setting up at the sending end sound vibrations identical in time, character and frequency with the current variations in said electric circuit, directing said sound vibrations against an objective, transforming the sound vibrations inflected by said objective when received into electric impulses identical in time, character and frequency with said received sound vibrations and measuring the time elapsing between the beginning of each set of electric impulses.

5. That method of measuring distance by sound inflection which consists in transforming electrical impulses into sound vibrations for a predetermined period, which sound vibrations are directed against the objective, transforming the sound vibrations which are inflected by said objective into electrical impulses and measuring the time between the commencement of said predetermined period and the first receipt of said inflected impulses.

6. Mechanism for measuring distance comprising a sounder, a receiving mechanism comprising a receiving transmitter and an indicating mechanism, means for operating the sounder and means adapted to operate automatically when the sounder is silent to connect the receiving transmitter and the indicating mechanism.

7. Mechanism for measuring distance comprising a sounder, a receiving transmitter, an indicating mechanism, means for operating the sounder intermittently, time measuring means operable when the sounder is silent for connecting the receiving transmitter with the indicating mechanism, and sound picking up means operable at all times when the sounder is silent for connecting the receiving transmitter with the indicating mechanism.

8. Mechanism for measuring distance comprising a sounder, a receiving transmitter, an indicating mechanism, means for operating the sounder intermittently, time measuring means operable momentarily when the sounder is silent for connecting the receiving transmitter with the indicating mechanism, and sound picking up means operable at all times when the sounder is silent for connecting the receiving transmitter with the indicating mechanism, said two connecting means being inoperable simultaneously.

9. Mechanism for measuring distance comprising a sounder, means for operating it, a receiving mechanism comprising a receiving transmitter and an indicating mechanism, a broken circuit connecting said receiving transmitter and said indicating mechanism, a series of brushes and means for adjusting their position to close said broken circuit, whereby said broken circuit may be closed when said sounder is silent and said receiving transmitter is energized.

10. Mechanism for measuring distance comprising a sounder, means for operating it, a receiving transmitter and an indicating mechanism, a broken circuit connecting said receiving transmitter and said indicating mechanism, a series of brushes, and means for adjusting their position to close said broken circuit, whereby said circuit may be closed when said sounder is silent and said receiving transmitter is energized, and means whereby the adjusted position of said brushes may be measured.

11. In a device of the kind described, an electromagnetic mechanism operable both to produce and receive impulses, means for energizing said mechanism to produce impulses, and means operable when said impulse-producing mechanism is inoperative to enable said mechanism to receive impulses.

12. In a device of the kind described, a sounder and a receiving transmitter, means for energizing said sounder comprising a source of electricity, a rotary wheel of insulating material having a contact thereon, brushes engaging said wheel and periodically engaging said contact, connections between said brushes, said source of electricity and said sounder, an indicator, and connections between said receiving transmitter and said indicator operable only when said sounder is silent.

13. In a device of the kind described, a sounder and a receiving transmitter, means for energizing said sounder comprising a source of electricity, a rotary wheel of insulating material having a contact thereon, brushes adapted to engage said contact, connections between said brushes, said source of electricity and said sounder, an indicator, a second set of brushes also adapted to engage said contact, and connections between said second set of brushes and said telephone receiver comprising an automatic circuit breaker adapted to break said circuit when said sounder is energized.

14. In a device of the kind described, a sounder and a receiving transmitter, means for energizing said sounder comprising a direct current source of electricity, a rotary wheel of insulating material having a contact thereon, brushes adapted to engage said contact, connections between said brushes, said source of electricity and said sounder, an indicator, a commutator having a contact thereon, adjustable brushes adapted to engage said contact when said sounder is silent, and connections between said adjustable brushes, said receiving transmitter and said indicator whereby upon the proper adjustment of said adjustable brushes with relation to said contact said receiving transmitter may operate said indicator.

15. In a device of the kind described, a sounder and a receiving transmitter, means for energizing said sounder comprising a source of electricity, a rotary wheel of insulating material having a contact thereon, brushes adapted to engage said contact, connections between said brushes, said source of electricity and said sounder, a telephone receiver, a commutator having a contact thereon, adjustable brushes adapted to engage said contact when said sounder is silent, and connections between said adjustable brushes, said receiving transmitter and said telephone receiver whereby upon the proper adjustment of said adjustable brushes with relation to said contact said receiving transmitter may operate said telephone receiver, and means for measuring the position of said brushes.

16. In a device of the kind described, a sounder, and means for energizing it comprising a source of electricity, means for rendering said sounder silent, a receiving transmitter and means operable when said sounder is silent to receive vibrations from said receiving transmitter.

17. A device for measuring distance comprising an electrically energized sounder having a diaphragm and means for bringing the diaphragm to rest coincidentally with the breaking of the sounder circuit consisting of a resistance connecting the terminals of the sounder.

18. As a means for measuring distance, a receiving transmitter, and an electrically-energized sounder having a diaphragm, and means for damping the diaphragm coincidentally with the deënergizing of said sounder whereby the receiving transmitter will be energized by the echo only, said means consisting of a resistance connecting the terminals of said sounder.

19. The method of measuring distance which consists in, first, rendering irresponsive the sound receiving mechanism, second, varying the current in an electric circuit simultaneously with the production of the sound to be inflected, thirdly, stopping the variation of the current flow, fourthly, damping the sending mechanism, and fifthly, rendering the receiving mechanism responsive.

20. The method of measuring distance which consists in causing the production of sound by varying the current in an electric circuit, then ceasing the current flow and simultaneously damping the sound producer and rendering a receiving mechanism responsive.

21. That method of measuring distance which consists in varying the current in an electromagnetic mechanism, causing the forces so produced to act directly and positively upon a diaphragm thereby setting the diaphragm in motion and setting up sound vibrations, directing said sound vibrations against an objective thereby inflecting the vibrations, receiving said inflected vibrations and measuring the elapsed time between the setting up of the vibrations and their reception.

REGINALD A. FESSENDEN.

Witnesses:
GEORGE O. G. COALE,
M. E. FLAHERTY.